Patented July 7, 1931

1,813,454

UNITED STATES PATENT OFFICE

VAMAN R. KOKATNUR, OF BROOKLYN, NEW YORK

SAPONIFICATION

No Drawing.    Application filed April 23, 1925. Serial No. 25,459.

My invention relates to the art of saponifying organic esters, particularly the esters of fatty acids, such as vegetable and animal fats. The process is also applicable to other organic esters and waxes as well.

The object of the invention is to perform such saponification in a more efficient and cheaper way than heretofore.

I attain the object of my invention by carrying out the saponification in the presence of an organic diluent which (1) does not react chemically with any of the other materials utilized or formed in the saponifying operation, which (2) is preferably a solvent of the esters or fats to be saponified, which (3) is not a solvent of the alcoholic component such as glycerine, which is set free in the saponification, and which (4) has a vapor pressure high enough (or a boiling point low enough) to distill with the alcoholic component at a temperature which is not injurious to any of the raw materials or products of the saponification process. The importance of these four characteristics of the diluent and the advantages to be derived from the use of such a diluent, will be more fully set forth in the detailed description of the invention.

It is to be noted that the particular nature of the chemical reaction or the chemical materials which actually enter into the chemical reaction, is not in itself a feature of my present invention, but the improvement which I have made relates to the manner in which such chemical materials are employed or such chemical reactions are conducted. That is to say, the invention is applicable to what I may term the chemistry of any of the well known processes for saponifying organic esters, whether the saponifying agent itself be the commonly employed caustic alkali or an acid or, for example, a catalyst such as employed in the Twitchell process.

Taking, for example, the specific case of a kerosene, which may be employed according to my invention as the inert organic diluent, I may briefly explain the important considerations attendant upon its use under the principles of my invention. Kerosene does not react chemically with any of the materials employed or produced in the saponifying process, it is a solvent for the esters or fats to be saponified, it is not a solvent of the alcoholic component, glycerine, which is to be produced as one of the products, and removed by distillation, and it offers sufficiently low boiling point to advantageously be distilled with glycerine under what I may term "partial pressure distillation". By this latter term I mean to indicate the principle of distillation involving two materials, neither of which is soluble in the other, so that distillation occurs when the sum of their partial pressures equals or exceeds the pressure to which the mixture is subjected during the distilling operation. Due to the principle of partial pressure distillation, the glycerine can thus be distilled with the kerosene at a temperature below that at which the glycerine would be decomposed, without the necessity of resorting to vacuum distillation. Referring to the solvent action which the kerosene has upon the esters of fatty acids, an important consideration in this connection resides in the advantageous presentation of the fat to the caustic or other saponifying agents employed. Where caustic soda, for example, is employed as the saponifying agent, it is ordinarily dissolved in water and its solution may be stirred with the fat to facilitate the reaction between the reacting chemical materials. By dissolving the fat in a diluent, according to my invention, the use of large quantities of water may thus be avoided and substantially dry powdered caustic containing very little water employed. The subsequent inconvenience of removing considerable quantities of water, which ordinary saponifying processes require, may be entirely avoided, as well as the salting out operation which is common in, for example, the soap industry for the purpose of separating the soap from the glycerine and water. A still further important consideration in the use of the inert diluent, and more particularly with reference to its not being a solvent for or soluble in the alcoholic component, glycerine, is the facility with which the glycerine in a high degree of purity can be directly obtained from the distillate of glycerine and diluent.

With the above understanding of the principles of the invention, I may explain its operation in practice by reference to specific examples as follows:

*Example I.*—I place 1600 to 2000 kilos of a kerosene fraction boiling at about 215° C. in a still fitted with a stirrer, and to it I add about 800 kilos of a vegetable or animal fat such as tallow, cocoanut oil, linseed oil, olive oil, or fish oil. This fat dissolves in the kerosene and to the solution I add 110 to 120 kilos of finely pulverized caustic soda containing very little water. I close the still, which may be connected to any suitable condenser, and start heating the still gradually until a temperature is reached at which saponification is proceeding and the distillation of kerosene together with glycerine starts. This temperature may, for example, vary between 200° and 215° C. The boiling point of the diluent selected will necessarily determine the limits of temperature which will occur. The distillation and saponification are continued until no more glycerine distills over, when the reaction is looked upon as complete. The distillation of glycerine may thus be used to observe the progress of saponification and to ascertain its end. After the distillation of glycerine has been completed, the distillation of the balance of the diluent, kerosene, may be carried on further until most of the diluent is removed. Instead of continuing the distillation of the diluent in this way, I may add about 30% water, after the glycerine distillation has been completed, and steam-distill out the remaining diluent, or I may simply filter the soap from the diluent and wash out the remaining diluent or displace it by water.

In the above example the amount of caustic required is proportional to the molecular weight of the fact and it is not necessary that any substantial excess be used. The quantity of the diluent required to completely distill off all glycerine is inversely proportional to the boiling point of the diluent, that is to say, the lower the boiling point of the diluent the larger is the quantity required, and in a general way this quantity is proportional to the ratio of the partial pressure of glycerine to that of the diluent at the temperature of boiling, which can be easily calculated. It is, of course, understood that the two together boil at a lower temperature than either of them separately. The amount of the diluent required is between 1 and 3 volumes of the fatty ester employed, depending upon the boiling point of the diluent. It may be desirable to leave small amounts of the diluent in the soap, in which case a diluent especially purified and free from objectionable odor may be used.

The distilled glycerine and diluent are, of course, collected in a condenser where they will form separate strata so that the one can be readily separated from the other. The glycerine will be of a high degree of purity, containing very little water.

*Example II.*—100 kilograms of beef tallow are mixed with the addition of about 6–7 kilograms water and .15 kilograms sulphuric acid 60° Bé. with about 1.5 parts of Twitchell's reagent and 200 kilograms of the diluent mentioned in Example I. The whole is put in a distilling apparatus fitted up with an agitator and a condenser. The distilling apparatus is slowly and gradually heated until the diluent begins to boil. The distillation and boiling of the diluent is continued at about the same temperature. Along with the diluent, glycerine passes over and is found condensed in a vessel which is used to catch the distillates. Being heavier and immiscible with the diluent it settles in the bottom and is easily separated in a concentrated condition. The fatty acids separated during the saponification, being soluble in the diluent and boiling at a temperature considerably higher than that of the diluent, remain behind in the distilling apparatus, just as high boiling but soluble paraffine remains behind in the distillation of the low boiling fractions of petroleum compounds. At the end of the operation in the still will be found fatty acids mixed with excess portion of the diluent, the Twitchell's reagent and sulfuric acid. The purification of the fatty acids may be brought about by any of the well-known methods. The acids may be neutralized by alkalies and the diluent removed and the fatty acids obtained by re-acidification, or the still residue may be first washed with water whereby sulphuric acid and Twitchell's agent are removed and the remaining mixture of fatty acids and the diluent can be steam-distilled to remove only the petroleum compounds. If necessary, substantially pure fatty acid residue may again be distilled. In the acid saponification, acids alone are not intended to be used. Twitchell's reagent with or without addition of suitable acids is intended to be used. The advantage of the process consists in the improvement over the Twitchell process in obtaining glycerine in concentrated form in contrast with approximately a 15% glycerine solution obtained in the Twitchell process.

In the case of saponification by steam under pressure, the procedure will be, for instance, as set forth in Example II with the exception that there is no Twitchell's reagent and no acid and the fact with the diluent and small amount of water stated are heated in a closed still capable of standing a pressure of 100 pounds per square inch, this heating being conducted, for example, at a temperature at 200° C. under pressure for a length of time sufficient to effect the desired amount of saponification, after which the still is opened and the distillation proceeds just as before, carrying over glycerine with the diluent and leaving behind the fatty acid in a remainder of the diluent. Purification of the acid may be conducted, as described in Example II or in any well known manner.

In saponification by means of acid without the Twitchell's reagent, the ingredients stated in Example II with the exception of Twitchell's reagent, may be employed in the quantity stated but with four kilograms of acid in accordance with familiar practice. In all other respects, the procedure is fully set forth under Example II.

A further important feature of the efficiency of the saponification according to my invention, is due to the law of mass action or chemical equilibrium. By continuously distilling the glycerine, which is a product of the reaction, during the progress of the saponification, this component is continually removed from the system so that the saponification continues to substantial completion.

I claim:—

1. The process of saponifying organic esters which comprises treating the organic ester with substantially anhydrous alkali in the presence of an inert organic diluent in which the alcoholic component of the ester is substantially insoluble, and simultaneously removing the alcoholic component in a concentrated form by partial pressure distillation of the diluent and the alcoholic component.

2. The method of conducting the operations of saponification of glycerides which comprises subjecting the fatty ester to the action of the saponifying agent in the presence of an organic diluent chemically inert to the materials employed and products obtained and not soluble in or a solvent of the resulting glycerine, said diluent being of lower boiling point than the glycerine and the acid constituent, and distilling off the said glycerine with the said diluent during the progress of the saponification.

3. The process of saponifying fatty esters and removing the alcoholic constituent which consists in acting on the fatty ester with the saponifying agent in the presence of an inert organic diluent of boiling point lower than the alcoholic and acid constituents of the esters, and removing the said alcoholic constituent and the diluent by distillation at the combined partial pressures of the two.

4. The process of saponifying organic esters which comprises treating the organic ester with a saponifying agent in the presence of an inert organic diluent of lower boiling point than the acid constituent, and in which the alcoholic component of the ester is substantially insoluble, and simultaneously removing the alcoholic component in a concentrated form by partial pressure distillation of the diluent and the alcoholic component.

VAMAN R. KOKATNUR.